(12) United States Patent
Song et al.

(10) Patent No.: US 10,171,221 B2
(45) Date of Patent: Jan. 1, 2019

(54) SCHEDULING METHOD AND APPARATUS OF MULTI-ANTENNA COMMUNICATION SYSTEM, AND METHOD AND APPARATUS FOR FEEDING-BACK CHANNEL QUALITY INDICATOR

(71) Applicant: Electronics and Telecommunications Research Institute, Daejeon (KR)

(72) Inventors: Young Seog Song, Daejeon (KR); Jun Hwan Lee, Seoul (KR); Juho Park, Daejeon (KR); Eun-Young Choi, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 224 days.

(21) Appl. No.: 14/952,476

(22) Filed: Nov. 25, 2015

(65) Prior Publication Data
US 2016/0149688 A1 May 26, 2016

(30) Foreign Application Priority Data

Nov. 25, 2014 (KR) .................. 10-2014-0165648
Nov. 19, 2015 (KR) .................. 10-2015-0162813

(51) Int. Cl.
| H04L 5/00 | (2006.01) |
| H04B 17/336 | (2015.01) |
| H04W 72/12 | (2009.01) |
| H04B 17/24 | (2015.01) |

(52) U.S. Cl.
CPC .......... *H04L 5/0057* (2013.01); *H04B 17/24* (2015.01); *H04B 17/336* (2015.01); *H04W 72/1231* (2013.01)

(58) Field of Classification Search
CPC ..... H04L 5/0057; H04B 17/24; H04B 17/336; H04W 72/1231
See application file for complete search history.

(56) References Cited

U.S. PATENT DOCUMENTS

| 2007/0098093 A1 | 5/2007 | Kwon et al. |
| 2010/0035627 A1 | 2/2010 | Hou et al. |
| 2012/0082116 A1 | 4/2012 | Kwon et al. |
| 2012/0182895 A1 | 7/2012 | Jwa |
| 2013/0343215 A1 | 12/2013 | Li et al. |
| 2014/0086171 A1 | 3/2014 | Kwon et al. |
| 2014/0086172 A1 | 3/2014 | Kwon et al. |

(Continued)

FOREIGN PATENT DOCUMENTS

| KR | 1011192810000 B1 | 2/2012 |
| KR | 1020140098509 A | 8/2014 |
| WO | 2014119940 A1 | 8/2014 |

*Primary Examiner* — Jackie Zuniga Abad
(74) *Attorney, Agent, or Firm* — William Park & Associates Ltd.

(57) ABSTRACT

Provided is a method for feeding back a channel quality indicator (CQI) by a terminal. The terminal receives, from a base station, at least one reference signal through at least one of multiple beams of the base station. The terminal measures a signal-to-interference plus noise ratio (SINR) for the at least one reference signal. The terminal determines a first level corresponding to the measured SINR among levels of a first CQI. In addition, the terminal feeds back the first CQI having the first level to the base station.

5 Claims, 11 Drawing Sheets

(56) References Cited

U.S. PATENT DOCUMENTS

| | | | |
|---|---|---|---|
| 2014/0254517 A1* | 9/2014 | Nam | H04B 7/0417 370/329 |
| 2014/0341048 A1* | 11/2014 | Sajadieh | H04L 5/0085 370/252 |
| 2015/0188688 A1 | 7/2015 | Kwon et al. | |
| 2015/0312928 A1 | 10/2015 | Kwon et al. | |
| 2015/0312929 A1 | 10/2015 | Kwon et al. | |
| 2016/0248496 A1* | 8/2016 | Bellamkonda | H04B 7/0413 |

\* cited by examiner

SCHEDULING METHOD AND APPARATUS OF MULTI-ANTENNA COMMUNICATION SYSTEM, AND METHOD AND APPARATUS FOR FEEDING-BACK CHANNEL QUALITY INDICATOR

CROSS-REFERENCE TO RELATED APPLICATION

This application claims priority to and the benefit of Korean Patent Application Nos. 10-2014-0165648 and 10-2015-0162813 filed in the Korean Intellectual Property Office on Nov. 25, 2014 and Nov. 19, 2015, the entire contents of which are incorporated herein by reference.

BACKGROUND OF THE INVENTION (a) Field of the Invention

The present invention relates to a scheduling method and apparatus of a multi-antenna communication system, and more particularly, to a method and an apparatus for feeding-back a channel quality indicator (CQI).

(b) Description of the Related Art

In a cellular mobile communication system, the quality of a propagation channel varies depending on the position and the speed of a terminal. A base station and the terminal perform transmission and reception through a control channel and a traffic channel every transmission time interval (TTI) with a modulation order and a code rate suitable for the quality of the propagation channel.

To this end, the terminal feeds back a channel quality indicator (CQI) to the base station by referring to a reference signal transmitted for the purpose of estimating the propagation channel by the base station. Even in single user multiple-input multiple-output (SU-MIMO) communication used to increase a peak user rate of the terminal or multi user MIMO (MU-MIMO) communication for expanding a sector throughput, the CQI is fed back as a parameter for adaptively transmitting a plurality of data streams.

In a long term evolution (LTE) standard of $3^{rd}$ generation partnership project (3GPP), 16 CQI levels which are fed back by the terminal are defined. Each CQI level is mapped to a modulation coding scheme (MCS) level for demodulation or decoding of each communication apparatus. Each MCS level is mapped to a specific signal-to-interference plus noise ratio (SINR).

Meanwhile, in recent years, for $5^{th}$ generation (5G) mobile communication, a mobile communication method using a millimeterwave (mmWave) band has been researched. In the millimeterwave band, since a path attenuation increases as compared with a low frequency band, a transmission and reception beamforming technology is primarily used. In the millimeterwave band, more antennas than a frequency band of $2^{nd}$ generation (2G) mobile communication can be used due to a relatively smaller wavelength. As a result, in the millimeterwave band, many streams can be simultaneously transmitted. As the number of simultaneously transmitted streams increases, interference applied among the streams can increase. In particular, since a CQI feed-back scheme of LTE MU-MIMO cannot accurately estimate an interference amount of paired streams, MU-MIMO performance can significantly deteriorate. Accordingly, for a smooth operation of the MU-MIMO, the CQI fed back by the terminal needs to be newly defined unlike the existing LTE.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for newly defining a CQI in a multiple-antenna communication system and feeding back the newly defined CQI.

The present invention has also been made in an effort to provide a method and an apparatus for performing downlink scheduling by using a newly defined CQI.

An exemplary embodiment of the present invention provides a method for feeding back a channel quality indicator (CQI) by a terminal. The method for feeding back the channel quality indicator (CQI) by the terminal includes: receiving, from a base station, at least one reference signal through at least one of multiple beams of the base station; measuring a signal-to-interference plus noise ratio (SINR) of the at least one reference signal; determining a first level corresponding to the measured SINR among levels of a first CQI; and feeding back the first CQI having the first level to the base station.

The first CQI may represent an SINR larger than an SINR which a second CQI used for data transmission of the base station is capable of maximally representing.

The method may further include receiving CQI feed-back mode information from the base station.

The determining of the first level may include deciding the number of bits of the first CQI and an SINR increase range depending on the level of the first CQI based on the CQI feed-back mode information, and determining the first level corresponding to the measured SINR among levels of the first CQI having the decided number of bits and the decided SINR increase range.

Another exemplary embodiment of the present invention provides a method for performing scheduling by a base station transmitting data by using multiple beams in a multiple-antenna communication system. The method for performing scheduling by the base station includes: receiving a first channel quality indicator (CQI) for at least one of the multiple beams from multiple terminals; calculating a second CQI having the smaller number of bits than the first CQI by using the first CQI; deciding a first modulation coding scheme (MCS) level for a first terminal among the multiple terminals by using the second CQI; and transmitting data to the first terminal based on the first MCS level.

A maximum signal-to-interference plus noise ratio (SINR) which the first CQI is capable of representing may be larger than a maximum SINR which the second CQI is capable of representing.

A minimum SINR which the first CQI is capable of representing may be smaller than a minimum SINR which the second CQI is capable of representing.

The calculating of the second CQI may include deciding a first beam to be applied to the first terminal among the multiple beams based on the first CQI, determining a second beam which interferes with the first beam among the multiple beams, and calculating an SINR for the first beam by using a first CQI for the second beam and a first CQI for the first beam among the first CQIs.

The calculating of the second CQI may further include determining the second CQI corresponding to the SINR for the first beam.

The deciding of the first MCS level may include determining the first MCS level corresponding to the second CQI.

Yet another exemplary embodiment of the present invention provides a method for performing scheduling by a base station transmitting data by using multiple beams in a multiple-antenna communication system. The method for performing scheduling by the base station includes: announcing to multiple terminals a first feed-back mode to be applied to the multiple terminals among multiple CQI feed-back modes; receiving a feedback of a first channel quality indicator (CQI) acquired according to the first feed-back mode with respect to at least one of the multiple beams from the multiple terminals receiving a reference signal of the base station through the multiple beams; calculating a second CQI which is capable of maximally representing an SINR smaller than an SINR which the first CQI is capable of maximally representing the first CQI by using the first CQI; and deciding a first modulation coding scheme (MCS) level for a first terminal among the multiple terminals by using the second CQI.

The number of bits of the first CQI may be equal to that of the second CQI.

An SINR mapped to a CQI level of the first CQI may constantly increase as the CQI level increases.

An increase range of an SINR mapped to a CQI level of the first CQI which increases according to the CQI level may be larger as the CQI level is higher.

The number of bits of the first CQI may be larger than that of the second CQI.

An SINR mapped to a CQI level of the first CQI may constantly increase as the CQI level increases.

The calculating of the second CQI may include deciding a first beam to be applied to the first terminal among the multiple beams based on the first CQI, determining a second beam which interferes with the first beam among the multiple beams, and calculating an SINR for the first beam by using a first CQI for the second beam and a first CQI for the first beam among the first CQIs.

The method may further include transmitting data to the first terminal based on the first MCS level.

The calculating of the second CQI may further include determining the second CQI corresponding to the SINR for the first beam.

The deciding of the first MCS level may include determining the first MCS level corresponding to the second CQI.

DETAILED DESCRIPTION OF THE EMBODIMENTS

Figure 1:
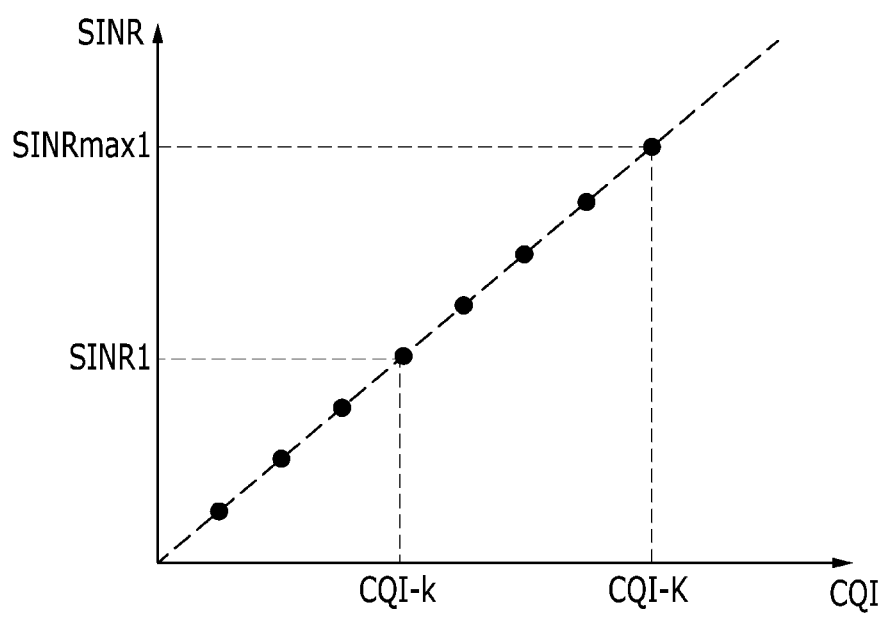
FIG. 1 is a diagram illustrating the relationship between a CQI and an SINR.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, a terminal may be referred to as a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), etc., and may include all or some functions of the terminal, the MT, the MS, the AMS, the HR-MS, the SS, the portable subscriber substation, the AT, the UE, etc.

Further, a base station (BS) may be referred to as an advanced base station (ABS), a high reliability base station (HR-BS), a nodeB, an evolved nodeB (eNodeB), an access point (AP), a radio access station (RAS), a base transceiver station (BTS), a mobile multihop relay (MMR)-BS, a relay station (RS) serving as the base station, a high reliability relay station (HR-RS) serving as the base station, a repeater, a macro base station, a small base station, etc., and may include all or some functions of the BS, the ABS, the HR-BS, the node B, the eNodeB, the AP, the RAS, the BTS, the MMR-BS, the RS, the HR-RS, the repeater, the macro base station, the small base station, etc.

FIG. 1 is a diagram illustrating a relationship between a CQI and an SINR.

The number of levels of the CQI is a capital K. Each CQI level is mapped to an SINR value. For example, the level of the CQI, k(CQI-k) is mapped to an SINR value (SINR1) and the level of the CQI, K(CQI-K) is mapped to a SINR maximum value (SINRmax1).

In an LTE standard, K=16 is defined.

Figure 2:
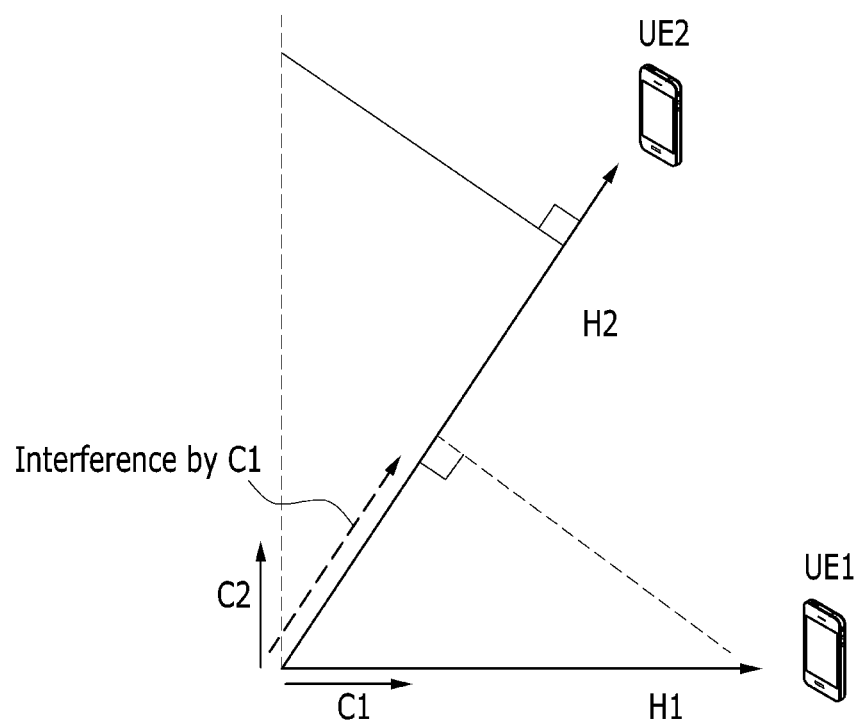
FIG. 2 is a diagram illustrating a method in which a base station performs MU-MIMO scheduling.

FIG. 2 is a diagram illustrating a method in which a base station performs MU-MIMO scheduling.

An MU-MIMO communication method of LTE or LTE-advanced (LTE-A) includes a precoding technique. In the precoding technique, a terminal selects one code vector based on a codebook and a propagation channel and feeds back a CQI depending on the selected code vector to a base station. Hereinafter, for easy description, the LTE or LTE-A is referred to as LTE.

As illustrated in FIG. 2, the base station pairs a code vector C1 and a code vector C2 (the code vector C1 and the code vector C2 are orthogonal to each other) fed back by a terminal UE1 and a terminal UE2 to perform the MU-MIMO scheduling.

However, since channels H1 and H2 of the terminals UE1 and UE are not completely orthogonal to each other like the code vectors C1 and C2, a stream transmitted through the code vector C1 may interfere with a stream transmitted to the terminal UE2 through the code vector C2. The interference may degrade a channel quality as compared with the CQI which is initially fed back from the terminal UE2, and as a result, a block error rate (BLER) may increase.

Hereinafter, an exemplary embodiment of the present invention will be described by using a mobile communication system that operates in a millimeterwave band as an example. However, this is just an example and the exemplary embodiment of the present invention may be applied even to a mobile communication system that operates in a frequency band other than the millimeterwave band.

Figure 3:
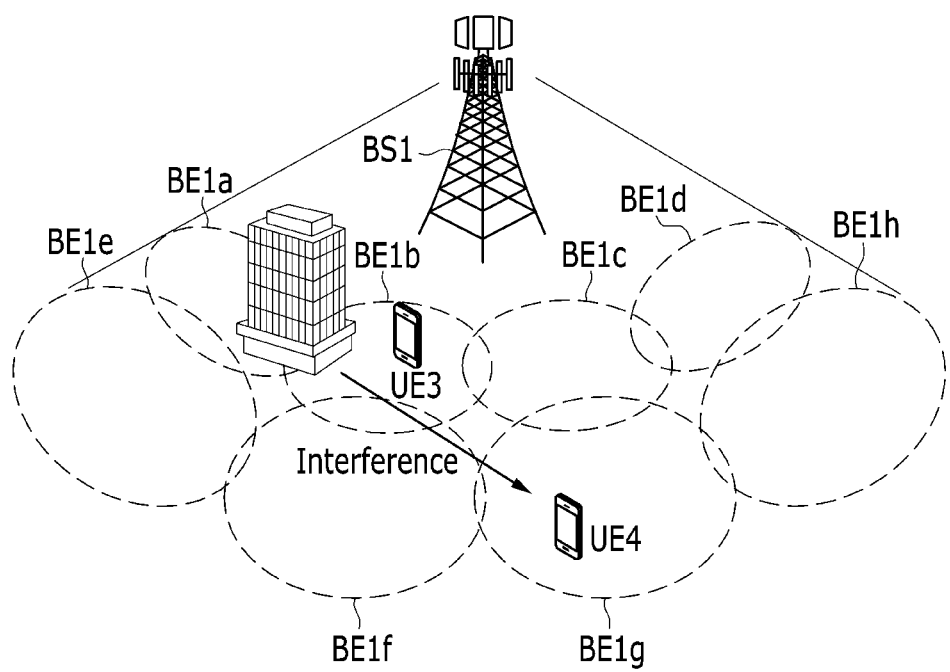
FIG. 3 is a diagram illustrating a method in which a mobile communication base station transmits data by using multiple beams in a millimeterwave band.

FIG. 3 is a diagram illustrating a method in which a mobile communication base station transmits data by using multiple beams in a millimeterwave band.

As illustrated in FIG. 3, a base station BS1 transmits multiple fixation beams BE1a to BE1h. In detail, the base station BS1 allocates the same transmission resource to the multiple beams BE1a to BE1h and transmits data to multiple terminals positioned in areas of the respective beams BE1a to BE1h by using at least one of the multiple beams BE1a to BE1h.

When each data is simultaneously transmitted to terminals UE3 and UE4 that belong to areas of a plurality of adjacent beams BE1b and BE1g in an MU-MIMO scheme, the interference easily occurs between the corresponding data. Therefore, the base station BS1 should be able to perform the MU-MIMO scheduling by previously considering the interference.

One of methods considering the interference includes a method (hereinafter, referred to as 'method M10') in which the terminal estimates an SINR considering the interference of other beams for a specific beam by using reference signals of multiple fixation beams received by the terminal, converts (maps) the estimated SINR into the CQI, and feeds back the CQI to the base station.

Further, the other one of the methods considering the interference includes a method (hereinafter, referred to as 'method M20') in which the terminal feeds back to the base station an SINR (SINR of each beam received by the terminal) for each beam not considering interference by another beam and the base station considers the interference. In this case, since the terminal does not consider the interference, an SINR corresponding to a maximum MCS level or more supported in the mobile communication system should be able to be fed back to the base station. Further, in this case, an SINR corresponding to a minimum MCS level or less supported in the mobile communication system may be fed back to the base station by the terminal.

Hereinafter, a method for defining a new CQI for the method M20 and a scheduling method using the newly defined CQI will be described in detail.

Figure 4:
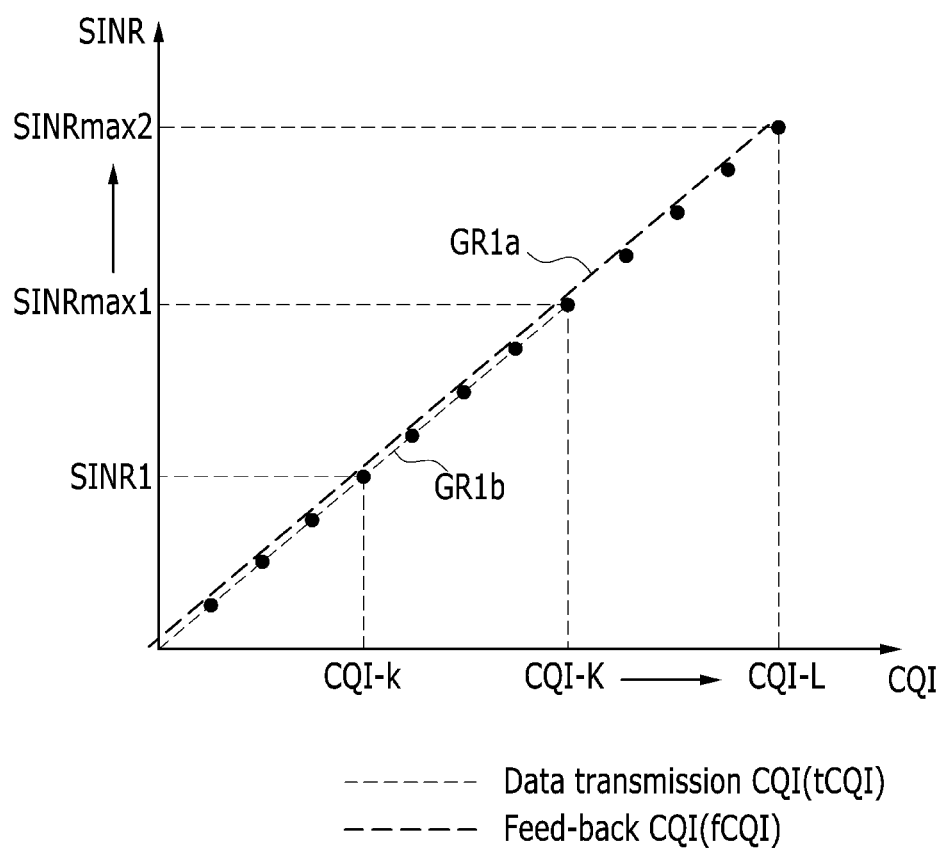
FIG. 4 is a diagram illustrating the CQI according to an exemplary embodiment of the present invention.

FIG. 4 is a diagram illustrating the CQI according to an exemplary embodiment of the present invention.

A graph GR1b shows a CQI set in the related art (LTE standard, and the like). In detail, the graph GR1b shows SINRs mapped to capital K CQI levels, respectively. The base station refers to the CQI of the graph GR1b at the time of transmitting data. Hereinafter, for easy description, a data transmission CQI which the base station refers to at the time of transmitting data is referred to as tCQI. An SINR corresponding to the MCS level is mapped to each tCQI level. For example, the level of the tCQI, k(tCQI-k) is mapped to the SINR value SINR1 and the level of the tCQI, K(tCQI-K) is mapped to the SINR maximum value SINRmax1.

The graph GR1a shows a CQI set which the terminal measures and feeds back. Hereinafter, for easy description, a feed-back CQI which the terminal feeds back is referred to as fCQI. In detail, a graph GR1b shows SINRs mapped to capital L (however, L>K) CQI levels, respectively. The number of bits of the fCQI may be larger than that of the tCQI. As a result, an SINR area (that is, an SINR range which the fCQI may represent) which the fCQI takes charge of may increase. In detail, the level of the fCQI, k(fCQI-k) is mapped to the SINR value SINR1, the level of the fCQI, K(fCQI-K) is mapped to the SINR value SINRmax1, and the level of the fCQI, L(fCQI-L) is mapped to an SINR maximum value SINRmax2. For example, when the maximum SINR value SINRmax1 which the tCQI may represent is approximately 22 dB, the maximum SINR value SINRmax2 which the fCQI may represent may be 30 dB or more.

Meanwhile, the case where the maximum SINR value corresponding to the maximum level of the fCQI is larger than the maximum SINR value corresponding to the maximum level of the tCQI is illustrated in FIG. 4. In the same manner, the minimum SINR value corresponding to the minimum level of the fCQI may be smaller than the minimum SINR value corresponding to the minimum level of the tCQI. That is, the minimum SINR value which the fCQI may represent may be smaller than the minimum SINR value which the tCQI may represent. That is, an SINR range which the tCQI takes charge of may be extended at both the high area and low area.

Meanwhile, as the maximum level value of the fCQI, fCQI-L and the number of bits of the fCQI are larger, the interference is more precisely reflected and a transmission capability is further improved. However, in determining the maximum level value of the fCQI, fCQI-L and the number of bits of the fCQI, the propagation channel and the modulation order of the communication system, and an appropriate signal to noise ratio (SNR) for implement a radio frequency (RF) need to be considered. For example, when all of the elements are considered, if the tCQI is 4 bits, the fCQI is preferably 5 bits.

The base station calculates an SINR of a terminal by referring to fCQI fed back by the terminal. Specifically, in calculating the SINR of the terminal by referring to the fCQI fed back by the terminal, the base station may calculate the SINR of the terminal by reflecting the interference according to a plurality of transmission beams selected by the base station. In addition, the base station converts the calculated SINR into tCQI, which the base station will refer to at the time of transmitting data.

In detail, the base station may use Equation 1 given below at the time of converting the tCQI.

$$SINR_j = 10\log_{10}\left(\frac{S_j^2}{\sum_{n \neq j} S_n^2 + n^2}\right) \quad \text{[Equation 1]}$$

$$= 10\log_{10}\left(\frac{S_j^2/n^2}{\sum_{n \neq j} (S_n^2/n^2) + 1}\right)$$

$$= 10\log_{10}\left(\frac{10^{(sinr(fCQI_j)/10)}}{\sum_{n \neq j} 10^{(sinr(fCQI_n)/10)} + 1}\right)$$

In Equation 1, j represents an index of a beam which the base station intends to transmit and n represents an index of a beam (hereinafter, referred to as 'interference beam for the beam of the index j') which interferes with the beam having the index j. The number of interference beams for the beam of the index j may be 0 or 1 or more. In Equation 1, $$\sum_{n \neq j}$$

represents a summation for all beam indexes n other than the beam index j.

In Equation 1, sin r( ) represents a function that converts (maps) the fCQI into the log scale SINR value. In Equation 1, $fCQI_j$ represents fCQI for the beam of the index j and $fCQI_n$ represents fCQI for the beam of the index n.

The terminal measures the intensities of all beams which are effective thereto and converts the measured intensities into the fCQI and feeds back the fCQI to the base station. In detail, the terminal may measure the intensities of the respective beams received by the terminal, determine beams of which the measured intensities are equal to or more than a threshold value as effective beams, arrange the effective beams according to the measured intensities, and feed back fCQIs for all or some of the arranged effective beams to the base station. Alternatively, the terminal may measure the intensities of the respective beams received by the terminal, arrange the corresponding beams according to the measured intensities, and feed back fCQIs for a predetermined number of beams among the arranged beams to the base station.

The base station schedules a beam suitable for each terminal by referring to the fCQI fed back from the terminals and acquires SINRs for the respective scheduled beams (the beams having the index j by using Equation 1. In addition, the base station maps the respective SINRs acquired by using Equation 1 to the tCQIs. That is, the base station determines the tCQIs (tCQIs of the beams having the index j) mapped to the acquired SINRs. In addition, the base station finally maps the respective tCQIs (tCQIs of the beams having the index j) to the MCS levels. That is, the base station determines the MCS levels (MCS levels of the beams having the index j) mapped to the tCQIs. In addition, the base station transmits data to the respective terminals according to the respective MCS levels.

Meanwhile, as illustrated in FIG. 4, a difference in SINR between the fCQI levels may be constant. That is, a slope of the graph GR1a may be constant. For example, a difference between an SINR value mapped to the level of the fCQI, k−1(fCQI-k−1) and an SINR value mapped to the level of the fCQI, k(fCQI-k) is equal to a difference between an SINR value mapped to the level of the fCQI, k(fCQI-k) and an SINR value mapped to the level of the fCQI, k+1(fCQI-k+1) (an SINR increase range depending on the level of the fCQI is constant).

Figure 5:
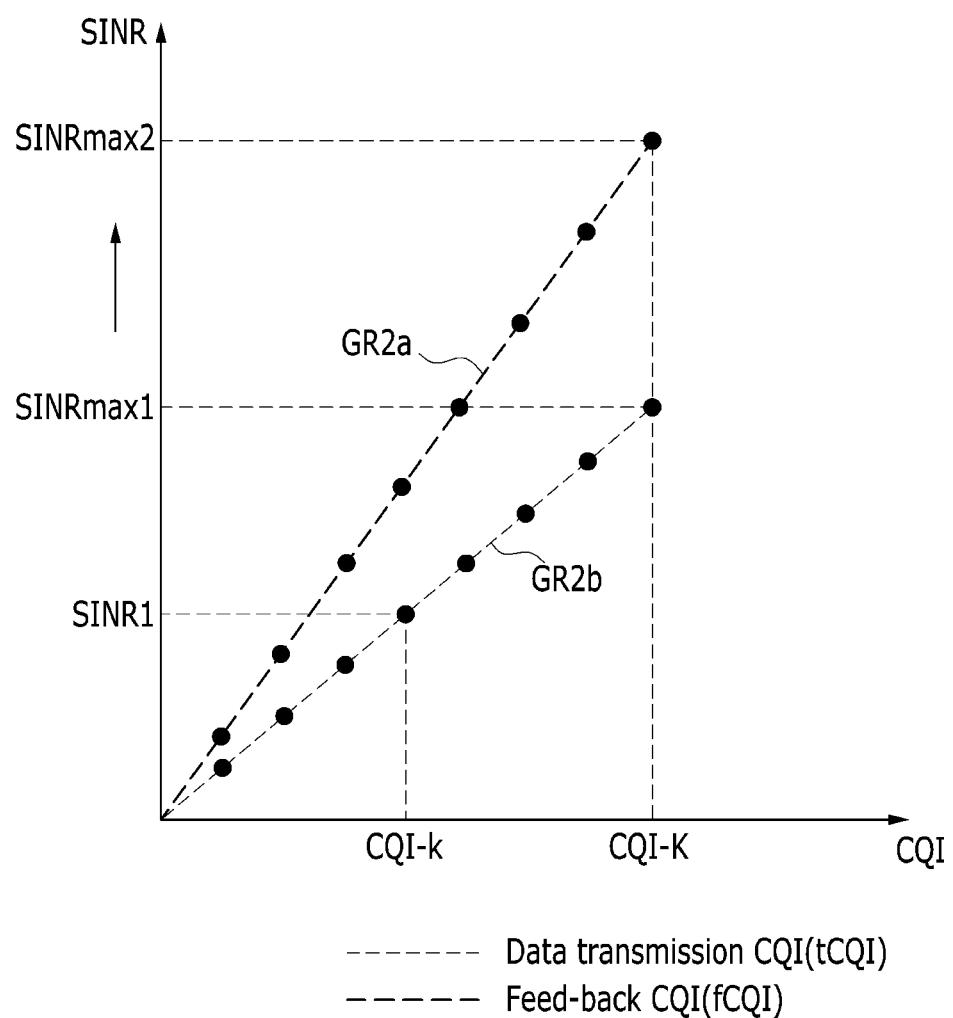
FIG. 5 is a diagram illustrating the CQI according to another exemplary embodiment of the present invention.
Figure 6:
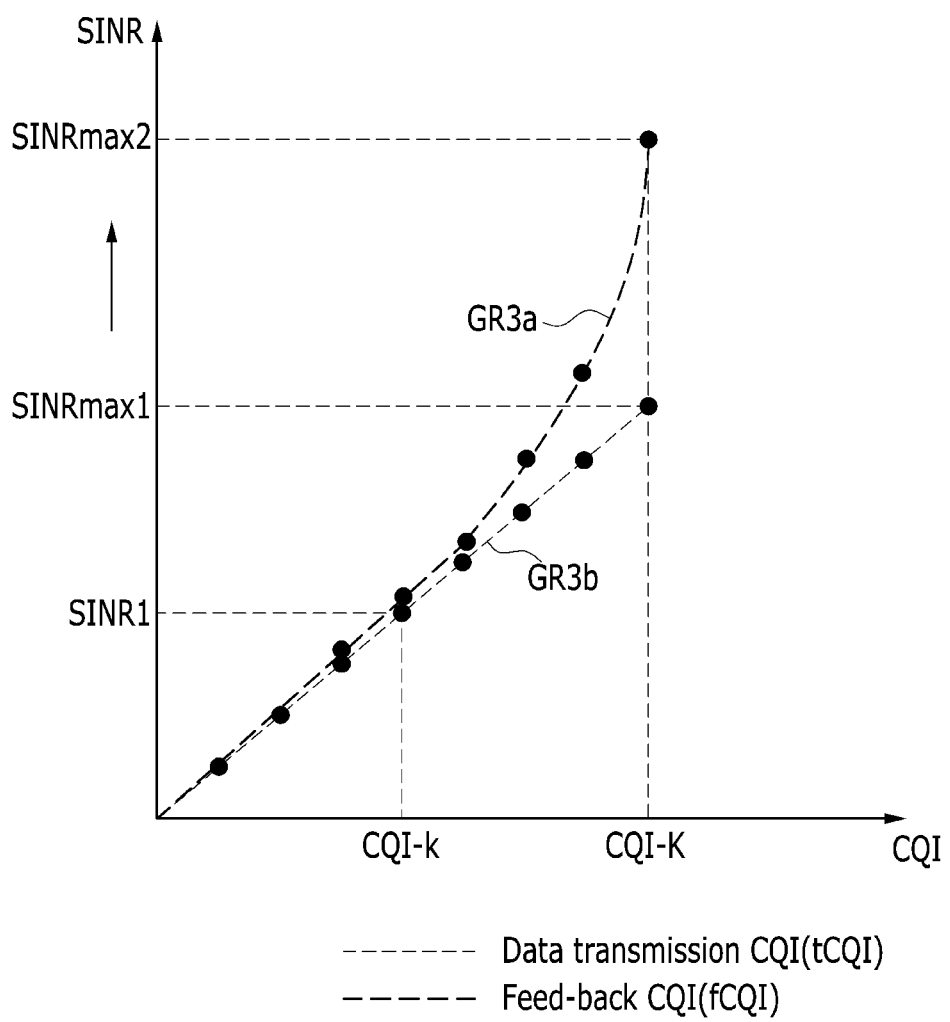
FIG. 6 is a diagram illustrating the CQI according to yet another exemplary embodiment of the present invention.

FIGS. 5 and 6 are diagrams illustrating the CQI according to another exemplary embodiment of the present invention.

In order to reduce system overhead, the number of bits (e.g., 4 bits) of the fCQI may be equal to the number of bits (e.g., 4 bits) of the tCQI. That is, the number of levels of the fCQI may be equal to that of the tCQI. However, as illustrated in FIGS. 5 and 6, an SINR area (an SINR range which the fCQI may represent) covered by the fCQI is larger than an SINR area (an SINR range which the tCQI may represent) covered by the tCQI.

Meanwhile, since the fCQI needs to cover the SINR area larger than the tCQI, the SINR difference between the fCQI levels is larger than the SINR difference between the tCQI levels as illustrated in FIGS. 5 and 6.

In detail, as illustrated in FIG. 5, the SINR difference between the fCQI levels may be constant. That is, a slope of the graph GR2a may be constant. For example, the difference between the SINR value mapped to the level of the fCQI, k−1(fCQI-k−1) and the SINR value mapped to the level of the fCQI, k(fCQI-k) is equal to the difference between the SINR value mapped to the level of the fCQI, k(fCQI-k) and the SINR value mapped to the level of the fCQI, k+1(fCQI-k+1) (the SINR increase range depending on the level of the fCQI is constant). Meanwhile, as shown in the graph GR2a, the maximum level of the fCQI, K(fCQI-K) is mapped to the SINR value SINRmax2, while as shown in the graph GR2b, the maximum level of the tCQI, K(tCQI-K) is mapped to the SINR value SINRmax1.

Meanwhile, as illustrated in FIG. 6, the SINR difference between the fCQI levels may be larger as the CQI level is higher. That is, a slope of a graph GR3a may have a larger value as the CQI level is higher. For example, the difference between the SINR value mapped to the level of the fCQI, k(fCQI-k) and the SINR value mapped to the level of the fCQI, k+1(fCQI-k+1) may be larger than the difference between the SINR value mapped to the level of the fCQI, k−1(fCQI-k−1) and the SINR value mapped to the level of the fCQI, k(fCQI-k) (the SINR increase range depending on the level of the fCQI increases). Meanwhile, as shown in the graph GR3a, the maximum level of the fCQI, K(fCQI-K) is mapped to the SINR value SINRmax2, while as shown in the graph GR3b, the maximum level of the tCQI, K(tCQI-K) is mapped to the SINR value SINRmax1.

Meanwhile, the MCS level converting method based on Equation 1 described above may be applied even to the exemplary embodiment illustrated in FIGS. 5 and 6. That is, the base station may convert the fCQI according to the exemplary embodiment of FIG. 5 or 6 into the MCS level by using Equation 1 described above.

Meanwhile, the case where the maximum SINR value corresponding to the maximum level of the fCQI is larger than the maximum SINR value corresponding to the maximum level of the tCQI is illustrated in FIGS. 5 and 6. In the same manner, the minimum SINR value corresponding to the minimum level of the fCQI may be smaller than the minimum SINR value corresponding to the minimum level of the tCQI. That is, an SINR range which the tCQI takes charge of may be extended at both the high area and low area.

As described above, when newly defined fCQI and tCQI are used, a CQI feed-back procedure of the terminal and a scheduling procedure of the base station will be described in detail with reference to FIGS. 7A, 7B, and 8.

Figure 7A:
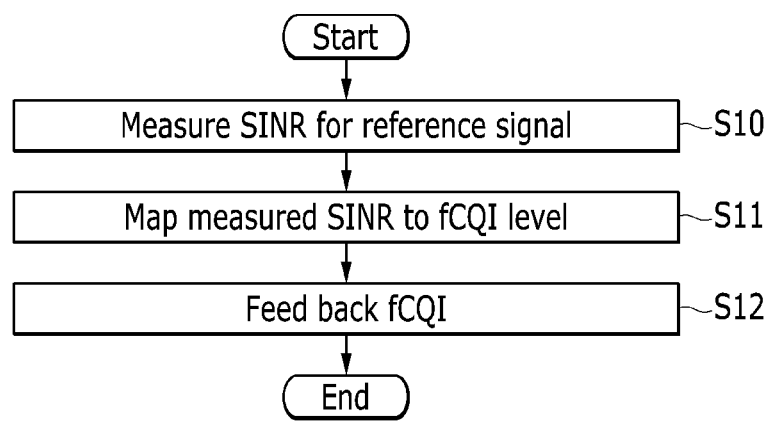
FIG. 7A is a diagram illustrating a method in which a terminal feeds back a newly defined CQI to a base station according to an exemplary embodiment of the present invention.

FIG. 7A is a diagram illustrating a method in which a terminal feeds back a newly defined CQI to a base station according to an exemplary embodiment of the present invention.

The terminal measures SINRs for each beam with respect to reference signals of respective beams received by the terminal (S10).

The terminal converts (maps) the SINR for each beam into an fCQI level (S11). That is, the terminal determines an fCQI level for each beam mapped to the SINR for each beam.

The terminal feeds back m levels (however, 1≤m) among the fCQI levels for each beam to the base station through an uplink (S12). In detail, the terminal may arrange the fCQI levels for each beam according to the sizes of the levels and feed back some high levels among the arranged fCQI levels for each beam to the base station.

Figure 7B:
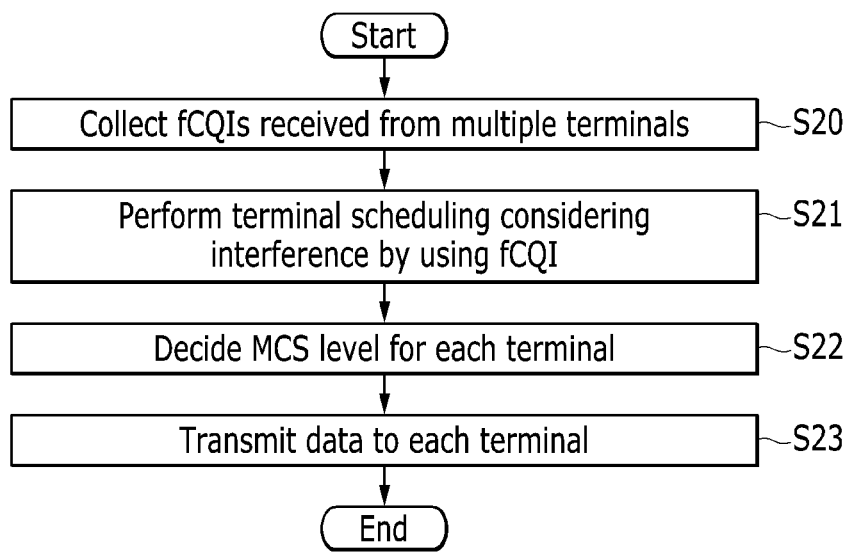
FIG. 7B is a diagram illustrating a method in which the base station performs scheduling by using the CQI fed back from the terminal according to the exemplary embodiment of the present invention.

FIG. 7B is a diagram illustrating a method in which the base station performs scheduling by using the CQI fed back from the terminal according to the exemplary embodiment of the present invention.

The base station receives fCQIs from multiple terminals and collects the received fCQIs (S20).

The base station performs terminal scheduling considering interference by using the collected fCQIs (S21). In detail, the base station selects (selects according to the scheduling) terminals to be spatially multiplexed to a specific TTI and calculates the interference by referring to the fCQIs fed back from the selected terminals (S21). For example, the base station may acquire SINRs for respective beams to be applied to the selected terminals by using Equation 1 described above.

The base station finally decides the MCS level for each terminal by using the calculated interference (S22). In detail, the base station may convert the SINR for each beam into the tCQI for each beam and convert the tCQI for each beam into the MCS level (alternatively, MCS level for each terminal) for each beam as described above.

The base station transmits data to the respective corresponding terminals with a specific TTI according to the respective decided MCS levels (S23).

Figure 8:
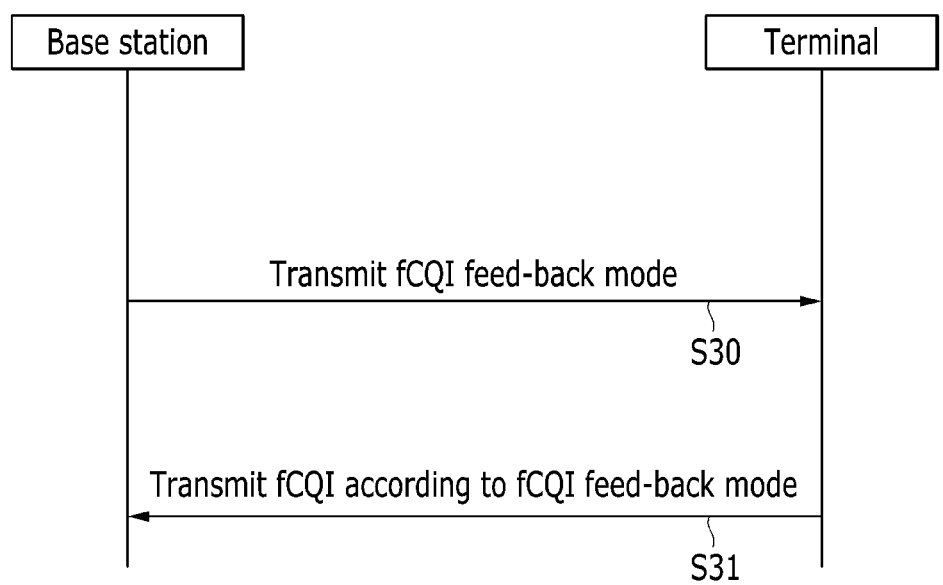
FIG. 8 is a diagram illustrating a method in which the base station announces a CQI feed-back mode to the terminal according to the exemplary embodiment of the present invention.

FIG. 8 is a diagram illustrating a method in which the base station announces a CQI feed-back mode to the terminal according to the exemplary embodiment of the present invention.

The base station transmits an fCQI feed-back mode to the terminal (S30). In detail, the base station may announce to the terminals one of the fCQI feed-back mode illustrated in FIG. 4, the fCQI feed-back mode illustrated in FIG. 5, and the fCQI feed-back mode illustrated in FIG. 6 through a higher message.

The terminal feeds back the fCQI to the base station according to the fCQI feed-back mode decided by the base station (S31). In detail, all of the terminals may feed back the fCQI acquired according to the same fCQI feed-back mode to the base station. Further, the terminal may determine the number of bits of the fCQI and the SINR increase range depending on the level of the fCQI based on the fCQI feed-back mode.

The base station performs scheduling by using the fCQIs received from the terminals as described above.

Meanwhile, the base station may semi-statically determine which fCQI feed-back mode among multiple fCQI feed-back modes is to be used by considering uplink overhead, and the like.

Figure 9:
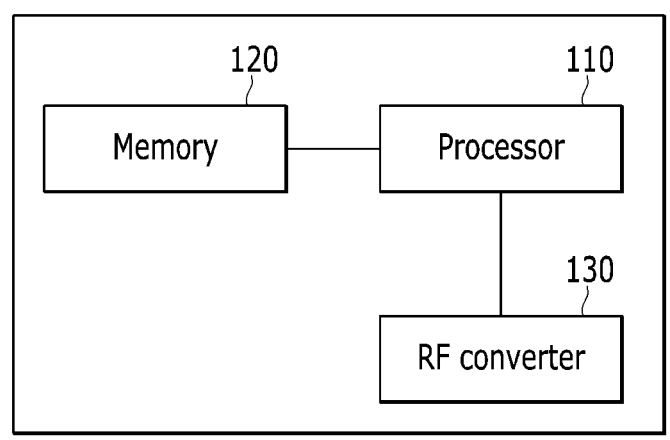
FIG. 9 is a diagram illustrating a configuration of the base station according to the exemplary embodiment of the present invention.

FIG. 9 is a diagram illustrating a configuration of the base station 100 according to the exemplary embodiment of the present invention.

The base station 100 includes a processor 110, a memory 120, and an RF converter 130.

The processor 110 may be constituted to implement procedures, functions, and methods related with the base station described in the present specification.

The memory 120 is connected with the processor 110 and stores various information related with the operation of the processor 110.

The RF converter 130 is connected with the processor 110 to transmit and/or receive a radio signal.

Figure 10:
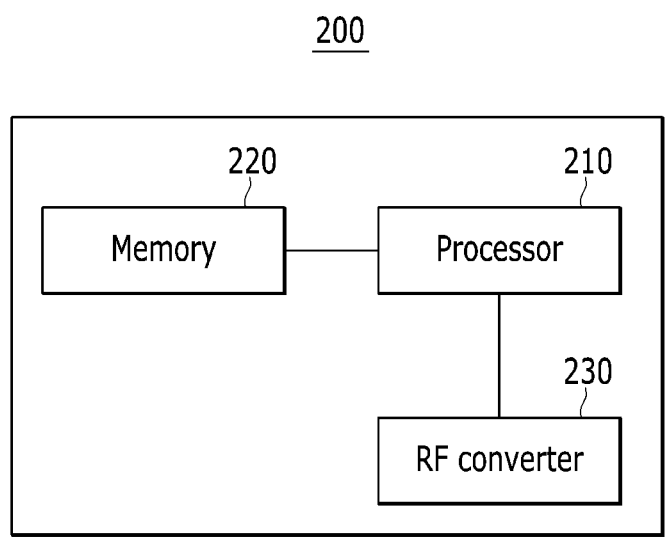
FIG. 10 is a diagram illustrating a configuration of the terminal according to the exemplary embodiment of the present invention.

FIG. 10 is a diagram illustrating a configuration of a terminal 200 according to the exemplary embodiment of the present invention.

The terminal 200 includes a processor 210, a memory 220, and an RF converter 230.

The processor 210 may be constituted to implement procedures, functions, and methods related with the terminal described in the present specification.

The memory 220 is connected with the processor 210 and stores various information related with the operation of the processor 210.

The RF converter 230 is connected with the processor 210 to transmit and/or receive a radio signal. The terminal 200 may have a single antenna or multiple antennas.

According to exemplary embodiments of the present invention, a multiple-antenna base station can transmit a reference signal and multiple terminals can measure a downlink channel quality based on the reference signal and feed back the measured downlink channel quality to a base station.

Further, according to the exemplary embodiments of the present invention, the multiple-antenna base station can perform MIMO scheduling based on the channel quality fed back from the terminal.

According to the exemplary embodiments of the present invention, a CQI in which interference is considered can be acquired in a communication system in which multiple interferences occur.

Further, according to the exemplary embodiments of the present invention, the base station performs scheduling in which the interference is considered by using the CQI fed back from the terminal to increase a communication capacity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for feeding back a channel quality indicator (CQI) by a terminal, the method comprising:
    receiving, from a base station, at least one reference signal through at least one of multiple beams of the base station;
    measuring a signal-to-interference plus noise ratio (SINR) for the at least one reference signal;
    receiving CQI feed-back mode information from the base station;
    deciding the number of bits of a first CQI and an SINR increase range depending on a level of the first CQI based on the CQI feed-back mode information;
    determining a first level corresponding to the measured SINR among levels of the first CQI having the decided number of bits and the decided SINR increase range; and
    feeding back the first CQ having the first level to the base station,
    wherein the first CQ is capable of representing an SINR larger than an SINR which a second CQI is capable of maximally representing, the second CQI being used for data transmission.

2. The method of claim 1, wherein: a number of bits of the first CQI is larger than that of the second CQI.

3. The method of claim 1, wherein: a number of bits of the first CQI is equal to that of the second CQI, and an SINR mapped to a level of the first CQI constantly increases as the level of the first CQI increases.

4. The method of claim 1, wherein: a number of bits of the first CQI is equal to that of the second CQI, and an increase range of an SINR mapped to a level of the first CQI which increases according to a level of the first CQI is larger as the level of the first CQI is higher.

5. The method of claim 1, wherein: a minimum SINR which the first CQI is capable of representing is smaller than a minimum SINR which the second CQI is capable of representing.

* * * * *